Figure 1:
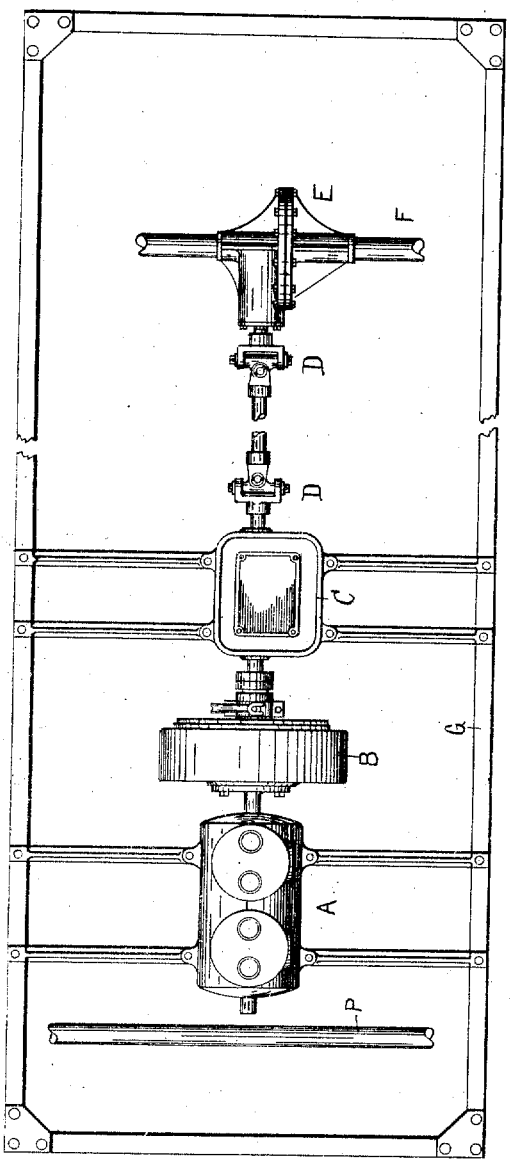

H. W. LEONARD.
EFFORT TRANSMITTING FRICTIONAL DEVICE.
APPLICATION FILED AUG. 11, 1903.

1,044,894. Patente Nov. 19, 1912.

2 SHEETS—SHEET 1.

WITNESSES:

INVENTOR
H. Ward Leonard
BY
ATTORNEY

H. W. LEONARD.
EFFORT TRANSMITTING FRICTIONAL DEVICE.
APPLICATION FILED AUG. 11, 1903.
1,044,894.
Patented Nov. 19, 1912.
2 SHEETS—SHEET 2.
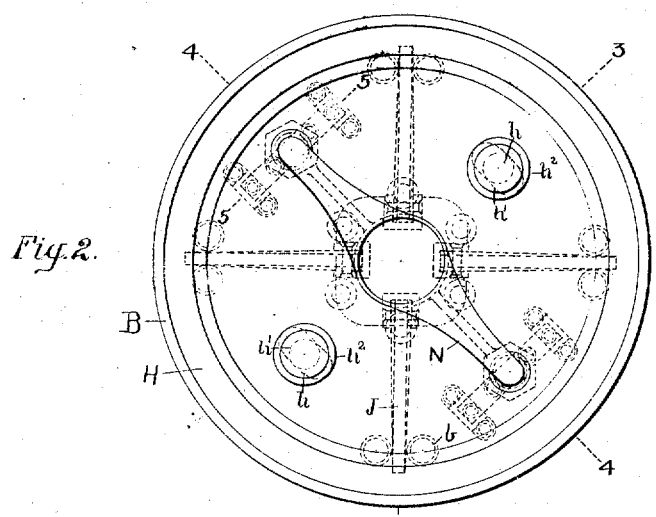
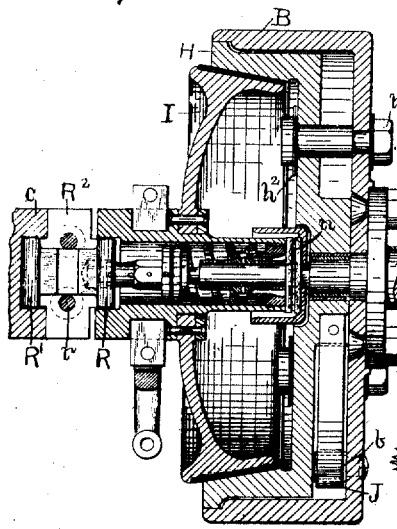
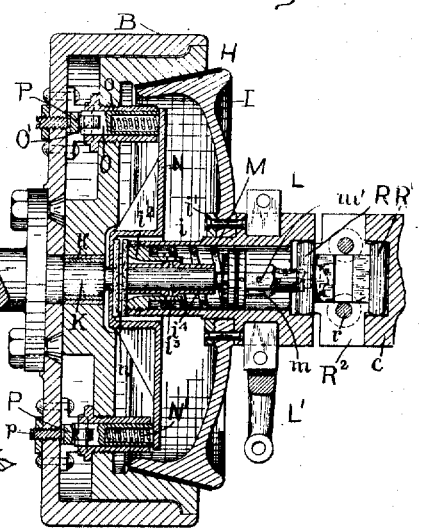
WITNESSES:
INVENTOR
H. Ward Leonard
BY
ATTORNEY

UNITED STATES PATENT OFFICE.

HARRY WARD LEONARD, OF BRONXVILLE, NEW YORK.

EFFORT-TRANSMITTING FRICTIONAL DEVICE.

1,044,894.  Specification of Letters Patent. Patented Nov. 19, 1912.

Application filed August 11, 1903. Serial No. 169,071.

*To all whom it may concern:*

Be it known that I, HARRY WARD LEONARD, a citizen of the United States, residing at Lawrence Park, Bronxville, in the county of Westchester and State of New York, have invented a certain new and useful Improvement in Effort-Transmitting Frictional Devices, of which the following is a specification.

My invention relates to friction clutches and similar devices, and the principal object is to automatically limit the transmitted torque to a practically constant and predeterminable maximum.

One of the principal applications of my invention is to motor driven vehicles in which there is a friction clutch or its equivalent between the motor and the tractive wheels. In the operation of such vehicles it is of the greatest importance both for the comfort of the passengers and for the proper protection of the mechanism that there be a definite maximum limit to the torque which can be transmitted through the friction clutch.
For example, if a car be at rest and the motor is operating at full speed, it is desirable that the machinery should be so arranged as to make it impossible for a careless, confused or ignorant operator to apply an excessive torque through the friction clutch. The motor operating at full speed with a large momentum in its fly wheel is capable of delivering to the transmission mechanism a very great strain if the friction clutch can be so engaged as to transmit a torque largely in excess of that required to properly accelerate the car from rest, which in fact is the case in friction clutches as heretofore employed.
By means of my invention I am enabled to adjust the torque transmitted through the friction clutch so as to obtain just the torque required and my improved transmitting mechanism automatically prevents the transmission of a larger torque than that required. It is well known that the coefficient of friction is an extremely variable quantity and my invention makes the frictional drive practically independent of variations in the coefficient of friction. The result of the use of my invention is that the maximum strain to which the transmission mechanism is subjected is greatly reduced. This means that the parts can be made lighter, and consequently cheaper, and that the wear and tear is greatly reduced. Furthermore my invention eliminates entirely one of the most objectionable features of a gasolene motor car, namely, the sudden jerking of the car when the friction clutch is improperly engaged by the operator. The preferred way in which I accomplish this may be briefly stated as follows: The torque transmitted through the frictional surfaces acts upon levers or equivalent devices which tend to open the clutch while a spring or equivalent adjustable means constantly tends to hold the frictional surfaces together. The spring is so adjusted as to overpower the tendency of the torque to open the clutch, and the adjustment is such that the transmitted torque has to reach a certain predeterminable strength before the said levers will act to overpower the closing spring and open the clutch. The torque is preferably transmitted through double acting flat springs which also tend to relieve the mechanism from hammer-blow shock. The greater the transmitted torque the more will these flat springs be bent, and friction rollers connected with these flat springs move on inclined planes and in so doing actuate a crosshead which tends to open the clutch.

My invention is illustrated in the accompanying drawings, in which—

Figure 1 is a plan view of the main frame of a motor car carrying the engine, clutch, change speed gear, flexible shaft and differential axle gear; Fig. 2 is an elevation of my improved clutch with the male member removed; Fig. 3 is a cross-section on the line 3—3 of Fig. 2; Fig. 4 is a cross-section on the line 4—4 of Fig. 2; Fig. 5 is a section on the line 5—5 of Fig. 2 of the means for automatically opening the clutch; and Fig. 6, a cross section of a preferred form of flexible coupling between the clutch and the gear box.

Referring to Fig. 1 of the drawings, A represents a gasolene or other engine; B the fly-wheel and clutch; C the change-speed gear box; D the universal joints; E the differential gear box; F the axles and G the main frame of the vehicle. The main frame, engine, change-speed gear, differential gear and universal joints may be of any suitable construction.

Referring now to Figs. 2, 3 and 4, *a* indicates the engine shaft having a flange which is bolted to the fly-wheel B forming part of the clutch. The clutch is of the friction cone type having female member H and male member I. The flange of member H is fitted into the flange of the fly-wheel so as to be supported thereby and be free to rotate in either direction. This member is held to the fly-wheel by two bolts $h$ (Figs. 2 and 3) each having a shoulder and nut (Fig. 3) whereby they are clamped to the web of the fly-wheel. The shanks of the bolts project through curved slots $h'$ in the web of member H and a washer $h^2$ is placed on the bolt under the head. The normal positions of the parts are shown in Fig. 2, and it will be seen that member H can be rotated in either direction a short distance, the length of movement in either direction from the normal position being equal to the length of the slots on either side of the bolts $h$. Member H is flexibly connected with the fly-wheel B through four flat built-up springs J (Figs. 2 and 3) secured in sockets on the hub of member H and each spring having its free end projecting between two rollers $b$ carried by studs secured to the web of the fly-wheel. Thus far it will be seen that the torque may be transmitted from shaft $a$ to fly-wheel B and from the fly-wheel to member H through springs J.

The male member I of the clutch has its web fitted on a hollow hub $i$ against a shoulder as shown in Fig. 4 and is secured thereto by bolts passing through the shoulder and web and through a collar $i'$ fitted on the hub. This hub has screwed into it at one end a socket $i^2$ having on its outer face a race-way for ball-bearings (hereinafter referred to) and near its inner end the socket is provided with pins $i^3$ by means of which a bearing sleeve $i^4$ is pivoted to the socket. Bearing sleeve $i^4$ is fitted to a stud shaft K which with hard steel bushings $k$ is driven into the hub of member H and said shaft and sleeve $i^4$ constitute the bearings on which member I slides when shifted into and out of engagement with member H. To open the clutch manually, hub $i$ is provided with a groove in which a collar L is fitted and with which collar a lever L' engages and which lever in practice will be connected in the usual way with the clutch controller, preferably a pedal on the vehicle. Any suitable means may, however, be provided for opening the clutch at the will of the operator. The clutch is designed to close through spring pressure and for that purpose a coiled spring M (Fig. 4) is placed within the hollow hub $i$ between socket $i^2$ and an adjusting nut $m$ on shaft K. By adjusting nut $m$, the tension of spring M is regulated and this regulation controls the torque transmittable from the shaft $a$ through the clutch, as will appear more fully hereinafter. Nut $m$ is held in its adjusted positions by a pin $m'$ passing through the nut and one of a series of holes in the shaft.

To automatically open the clutch when the torque exceeds a predetermined amount, I provide the cross piece or member N (Figs. 2 and 4) which is sleeved on the shaft K at its center where the member N is formed into a cup and is provided with a plate having a raceway for ball bearings $n$ (Figs. 3 and 4). This ball bearing is between member N and the hub $i$ of member I of the clutch. Member N moves with clutch member H when the torque carries member H around with the fly-wheel, and the ball bearing is provided to reduce friction between $i$ and N, since considerable spring pressure is on the member N. Each end of this member N engages a pin or plunger O (Figs. 2 and 4) and these pins work in sockets $o$ screwed through the web of member H. Each plunger has a roller O' (Figs. 4 and 5) at the inner end and these rollers work on cam plates P carried in blocks secured to the web of the fly-wheel. It will be seen that when the fly-wheel rotates member H will rotate therewith, a torque being applied through springs J and that according to the amount of torque springs J will bend more or less, which results in relative rotary movement between the fly-wheel and member H. This movement in either direction, causes rollers O' to ride up on the cam plates P, as shown in dotted lines in Fig. 5, resulting in an outward longitudinal movement of plungers O. The outward movement forces member N in the same direction and since the socket of the member N is in direct contact with the hub $i$, member I will be forced outward to a corresponding extent against the pressure of spring M and reduce the frictional engagement of the clutch members, or entirely open the clutch.

From the foregoing it will be seen that by varying the tension of spring M, the effort required at member N to displace clutch member I can be varied, and hence springs J will bend more or less in applying the torque according to the pressure of spring M.

To compensate for the layer of the cam plates, and in some instances to adjust the automatic clutch opener, I provide screws $p$ (Figs. 4 and 5) which pass through the web of the fly-wheel and bear against the underside of the cam plates. Locking plates $p'$ are provided to lock the nuts on screws $p$.

When the clutch is opened manually, as in stopping the vehicle, member I is drawn outwardly from member H by means of lever L' and in doing so spring M is compressed. This movement would tend to move hub $i$ from member N at the cup, and cause displacement of the ball bearing, but to guard against this, I provide coiled springs N' (Fig. 4) which are socketed in plungers O and which tend to drive member N away from member H and toward member I, so that when member I is moved outward by the operator, springs N' cause member N to follow and maintain the ball bearing in proper condition. When member I is released by lever L', member I and member N will move into operative position again through the pressure of main spring M.

The connection between the male member of the clutch and the shaft projecting from the change-speed gear is preferably a flexible or universal joint, and in order that such joint may be readily put in place and be easily removable to permit adjustment of the clutch spring M, and also to permit the free movement of the clutch member I, I have provided the joint shown in Figs. 3, 4 and 6. This joint is made in three parts, R, R¹ and R². The parts R and R¹ are square heads having short reduced portions which fit in the square hole formed by the two collar sections R². The head of part R is formed hollow to admit the end of shaft K. The outer end of the hub of member I has a square recess to receive the head R and the end of the shaft projecting from the gear box C is provided with a recessed flange c to receive the head R¹. The collar R² is held together by bolts r. The faces of heads R and R¹ are slightly rounded to avoid cramping of the parts if the shaft is not in exact alinement. In assembling the coupling, the heads are first put into place, there being sufficient clearance between the heads to permit this, and then the two sections of collar R² are placed in position and bolted together. The face of the collar is slightly less in width than the space between the face of hub i and the face of head c, as shown by the clearance in Figs. 3 and 4, so as not to interfere with the movement of hub i when member I is moved away from member H in disengaging the clutch.

It will be observed that the clutch will automatically act whether the excessive torque is transmitted from the gas engine to the driven portion, or whether the excessive torque is transmitted in the reverse direction, such as is often the case if the clutch is closed under conditions such that the speed of the driven part is higher than that of the driving shaft; this may frequently occur due to the change gear being improperly set when the friction clutch is closed.

It will be observed that the friction clutch is balanced in itself; that is, there is no external end thrust due to the friction clutch mechanism when in its normal operating condition.

While I have illustrated and described one embodiment of my improved form of clutch, it will be understood that various changes may be made therein without departing from the scope of my invention as indicated by the following claims.

What I claim is:

1. The combination of a driving part, a driven part, means for disconnecting said parts at the will of the operator, means responsive to the torque transmitted tending to automatically disconnect the said parts, and means acting counter to said second named means and normally tending to keep said parts in driving connection.

2. In a friction clutch, means whereby one of the frictional surfaces may be moved away from the other at the will of the operator for varying the torque transmitted, and automatic means responsive to the torque transmitted for moving one of the frictional surfaces relatively to the other to control the torque transmitted.

3. In a clutch, means whereby one part of the clutch may be moved relatively to the other at the will of the operator for varying the torque transmitted, and automatic means responsive to the torque transmitted for positively moving one part of the clutch relatively to the other and thereby preventing the torque transmitted from exceeding a predetermined amount while maintaining an operative connection.

4. In a power transmitting device, means whereby the torque of the power transmitted may be controlled at the will of the operator, and automatic means comprising a torque responsive movable element for controlling the torque of the power transmitted while maintaining an operative connection.

5. In a friction clutch, means tending to move the frictional surfaces together, a second means automatically responsive to the effort transmitted tending to positively move such surfaces apart, and independent means under the control of the operator for moving the said surfaces apart.

6. A power transmitting device comprising two clutch parts, one of said clutch parts comprising a primary section and a secondary section, means for yieldingly transmitting power from the primary section to the secondary section, whereby the motion of the secondary section and the other clutch part engaged therewith may be retarded by an increase in torque, means actuated by such retardation tending to open the clutch when the torque exceeds a predetermined amount, yieldable means constantly tending to close said clutch, and means for adjusting the force exerted by said yieldable means.

7. A power transmitting device comprising a movable clutch part, a secondary section having a clutch part adapted to engage the said movable clutch part, movable devices in said secondary section to displace the movable clutch part, a primary section, and power-transmitting springs connecting the two sections, the primary section being provided with means for moving the movable devices when the springs have received a predetermined torque.

8. A power transmitting device comprising a member having an adjustable clutch part, a member composed of a primary section and a secondary section, the latter having a clutch part formed to engage the said adjustable clutch part, a spring between said sections and adapted to yieldingly transmit motion from the primary to the secondary section, means controlled by a predetermined movement of the spring tending to separate the clutch parts, and yieldable means tending to hold said clutch parts in contact.

9. A transmitting device having two parts, each of which may at times be the driving part and the other the driven part, and automatic means comprising a torque responsive movable element for limiting the torque transmitted to a predetermined maximum amount independently of which of said parts is the driving part and when the device is moving in the same direction.

10. A power transmitting device having two parts, each of which may at times be the driving part and the other the driven part, and automatic means comprising a torque responsive movable element for preventing the torque transmitted from exceeding a predetermined amount while maintaining an operative connection independently of which part is the driving part and when the device is moving in the same direction.

11. The combination of two parts, each of which may at times be the driving part and the other the driven part, means comprising a movable element responsive to the torque transmitted tending to automatically disconnect said parts independently of which of said parts is the driving part and when the parts are moving in the same direction, and means acting counter to said first named means and normally tending to keep said parts in driving connection.

12. A power transmitting device comprising two clutch parts, one of said clutch parts comprising a primary section and a secondary section, means for yieldingly transmitting power from the primary section to the secondary section, whereby the motion of the secondary section and the other clutch part engaged therewith may be retarded by an increase in torque, means actuated by such retardation tending to open the clutch when the torque exceeds a predetermined amount, yieldable means constantly tending to close said clutch and acting to close said clutch after the clutch has been automatically opened, and means for adjusting the force exerted by said yieldable means.

13. The combination of a primary member, a coöperating member adapted to be frictionally engaged to transmit a force, a third member having a movement relatively to one of the said other members and which relative movement is dependent upon the force transmitted, and means responsive to the movement of said third member for controlling the frictional engagement between said primary and coöperating member when the parts are moving in the same direction independently of whether said primary member or coöperating member is the driving part.

14. The combination of a primary member, a coöperating member adapted to be frictionally engaged to transmit a force, a third member having a movement relatively to one of the said other members and which relative movement is dependent upon the force transmitted, and means responsive to the movement of said third member for controlling the frictional engagement between said primary and coöperating members independently of the direction of movement and independently of whether said primary member or coöperating member is the driving part.

15. The combination of a driving part, a driven part, a clutch for connecting said parts, and means comprising a torque responsive movable element for automatically preventing the torque transmitted from exceeding a predetermined maximum amount independently of the direction of movement and also independently of which of said parts is the driving part.

16. The combination of a driving part, a driven part, a clutch for connecting the parts, and means comprising a torque responsive movable element for automatically preventing the torque transmitted from exceeding a predetermined maximum amount and for maintaining an operative driving connection independently of the direction of movement and also independently of which of said parts is the driving part.

17. In a friction clutch, the combination of two members having surfaces frictionally engaged, means for forcing said members together, means for adjusting the force exerted by said means, a third member movable relatively to one of said members in response to variations of the force transmitted, and means controlled thereby for varying the pressure between the said surfaces.

18. In a friction clutch, the combination with the two members having engaging surfaces, of adjustable means for determining the maximum pressure between said surfaces, and independently adjustable means responsive to the force transmitted for regulating the pressure between said surfaces.

19. The combination with the engaging members of a friction clutch, of means whereby the clutch may be opened at the will of the operator, and automatic means comprising a torque responsive movable element for preventing a force from being transmitted to the clutch in excess of a predetermined maximum while maintaining an operative connection independently of the direction of movement of the driving part.

20. In a friction clutch, two clutch members having frictional engaging surfaces, automatic means comprising a torque responsive movable element for preventing transmission through said surfaces of a force in excess of a predetermined maximum and independently of the coefficient of friction between said surfaces, and means for opening said clutch at the will of the operator.

21. A friction clutch comprising two members having coöperating frictional surfaces, means tending to force one of said surfaces into engagement with the other and for balancing the end thrust of said clutch when said surfaces are in engagement, and means movable in response to the force transmitted for automatically regulating the amount of force transmitted.

22. The combination of a primary member, a coöperating member adapted to be frictionally engaged to transmit a force, a third member having a movement relatively to one of the said other members and which relative movement is dependent upon the force transmitted, and means responsive to the movement of said third member for controlling the frictional engagement between said primary and coöperating member.

23. A transmitting device comprising parts having frictional surfaces, means tending to maintain a pressure between said surfaces, and means acting counter to said first named means for automatically limiting the maximum effort which can be transmitted through said surfaces, said latter means comprising a torque responsive movable element.

24. A transmitting device comprising parts having coöperating surfaces, means tending to maintain said surfaces in tractive engagement, and means comprising a movable element automatically responsive to the effort transmitted for automatically limiting the effort transmitted to a certain predeterminable maximum.

25. In a friction clutch, the combination with friction members, of elastic mechanism through which the turning force is transmitted and whose capacity of resistance to said turning force is the measure of the maximum torque that the clutch will transmit.

26. In a friction clutch, the combination with the driving shaft, a driven shaft, and two friction members one of which is positively rotatable with said driven shaft, of elastic mechanism through which the turning force is transmitted and whose capacity of resistance to said turning force is the measure of the maximum torque that the clutch will transmit.

27. In a friction clutch, the combination with means positively operated by the torque for reducing the frictional engagement, of means operated independently of the torque for disengaging the clutch.

28. In a friction clutch, the combination with means positively operated by the torque for limiting the torque to a predetermined maximum whose value is independent of the coefficient of friction, of means operated independently of the torque for disengaging the clutch.

29. A friction clutch comprising elastic mechanism through which the turning force is transmitted and whose capacity of resistance to the turning force is the measure of the maximum torque that the clutch will transmit, and mechanism operated independently of torque for disengaging the clutch.

30. In a friction clutch, the combination with friction members, of elastic mechanism through which the turning force is transmitted and whose capacity of resistance to said turning force is the measure of the maximum torque that the clutch will transmit, and mechanism operated independently of torque for disengaging the clutch.

31. In a motor car friction clutch, the combination of the frictional clutch members, and means dependent upon the torque transmitted through the clutch for positively moving one of the friction clutch members in a direction to reduce the pressure between the frictional surfaces, and in also manually controlling the torque.

32. In a friction clutch, the combination of the frictional clutch members, and means dependent upon the torque transmitted for automatically varying the pressure between the frictional surfaces of the clutch.

33. In a friction clutch, the combination of two frictional clutch members, means for forcing one of said members into engagement with the other and for balancing the end thrust, and auxiliary means for automatically controlling the pressure between said surfaces.

34. In a friction clutch, a main driving member, a member rotating with said main driving member, a resilient member connected at one end to said main driving member and at the other end to said rotatable member, said resilient member being adapted to yield under a predetermined torque and allow a change in the relative positions of the aforesaid members, a friction member, means for holding said friction member in engagement with said rotatable member, and automatic means for disengaging said rotating and friction members following a change in the relative positions of the said main driving member and rotating member.

35. The combination with a driving shaft and a driven shaft, of coöperating clutch members carried by said shafts, one of said clutch members being movably mounted to releasably engage the other member, and means whereby upon a predetermined load the shaft carrying one of said clutch members is permitted to rotate differentially with respect to said clutch member.

36. The combination with a driving and a driven shaft, of a friction clutch for releasably connecting said shafts, means for holding the clutch in engagement, means whereby the engagement of the clutch tends to automatically effect a release independently of the holding means, and yielding means separate from the holding means for opposing such release and adapted to overcome said holding means at a predetermined load.

This specification signed and witnessed this 1st day of August 1903.

H. WARD LEONARD.

Witnesses:
LEONARD KEBLER,
CAROLYN G. LEONARD.

---

It is hereby certified that in Letters Patent No. 1,044,894, granted November 19, 1912, upon the application of Harry Ward Leonard, of Bronxville, New York, for an improvement in "Effort-Transmitting Frictional Devices," errors appear in the printed specification requiring correction as follows: Page 3, line 83, for the words "relatively to" read *away from;* page 5, lines 104-105, strike out the comma and words "and in also manually controlling the torque" and insert a period; and that the said Letters Patent should be read with these corrections therein that the same may conform to the record of the case in the Patent Office.

Signed and sealed this 24th day of December, A. D., 1912.

[SEAL.]

C. C. BILLINGS,
*Acting Commissioner of Patents.* change in the relative positions of the said main driving member and rotating member.

35. The combination with a driving shaft and a driven shaft, of coöperating clutch members carried by said shafts, one of said clutch members being movably mounted to releasably engage the other member, and means whereby upon a predetermined load the shaft carrying one of said clutch members is permitted to rotate differentially with respect to said clutch member.

36. The combination with a driving and a driven shaft, of a friction clutch for releasably connecting said shafts, means for holding the clutch in engagement, means whereby the engagement of the clutch tends to automatically effect a release independently of the holding means, and yielding means separate from the holding means for opposing such release and adapted to overcome said holding means at a predetermined load.

This specification signed and witnessed this 1st day of August 1903.

H. WARD LEONARD.

Witnesses:
LEONARD KEBLER,
CAROLYN G. LEONARD.

---

Corrections in Letters Patent No. 1,044,894.

It is hereby certified that in Letters Patent No. 1,044,894, granted November 19, 1912, upon the application of Harry Ward Leonard, of Bronxville, New York, for an improvement in "Effort-Transmitting Frictional Devices," errors appear in the printed specification requiring correction as follows: Page 3, line 83, for the words "relatively to" read *away from;* page 5, lines 104–105, strike out the comma and words "and in also manually controlling the torque" and insert a period; and that the said Letters Patent should be read with these corrections therein that the same may conform to the record of the case in the Patent Office.

Signed and sealed this 24th day of December, A. D., 1912.

[SEAL.]

C. C. BILLINGS,
*Acting Commissioner of Patents.*

It is hereby certified that in Letters Patent No. 1,044,894, granted November 19, 1912, upon the application of Harry Ward Leonard, of Bronxville, New York, for an improvement in "Effort-Transmitting Frictional Devices," errors appear in the printed specification requiring correction as follows: Page 3, line 83, for the words "relatively to" read *away from;* page 5, lines 104-105, strike out the comma and words "and in also manually controlling the torque" and insert a period; and that the said Letters Patent should be read with these corrections therein that the same may conform to the record of the case in the Patent Office.

Signed and sealed this 24th day of December, A. D., 1912.

[SEAL.]

C. C. BILLINGS,
*Acting Commissioner of Patents.*